United States Patent [19]

Griscom

[11] 4,362,093

[45] Dec. 7, 1982

[54] BARBEQUE GRILL

[76] Inventor: Billie G. Griscom, Poste Restante, Jan Smuts Airport 1627, South Africa

[21] Appl. No.: 167,371

[22] Filed: Jul. 18, 1980

[51] Int. Cl.³ .............................................. A47J 27/00
[52] U.S. Cl. ........................................ 99/339; 99/340; 99/401; 99/446; 99/447; 126/25 R
[58] Field of Search ..................... 99/339, 340, 421 H, 99/446, 401, 447, 393, 400, 444, 445; 126/25 R, 9 R, 41 R

[56] References Cited

U.S. PATENT DOCUMENTS

| | | | |
|---|---|---|---|
| 2,314,791 | 3/1943 | Jones | 99/339 |
| 2,512,223 | 6/1950 | Contiguglia | 99/339 |
| 2,621,586 | 12/1952 | Roney | 99/339 |
| 3,380,444 | 4/1968 | Stalker | 99/339 |
| 3,683,791 | 8/1972 | Rast | 99/447 |
| 4,034,662 | 7/1976 | McLane | 99/445 |
| 4,074,675 | 2/1978 | Dailey | 126/41 R |

Primary Examiner—Billy J. Wilhite
Attorney, Agent, or Firm—Barry L. Haley

[57] ABSTRACT

An outdoor barbeque cooking unit suitable for outdoor cooking including simultaneous baking, grilling, roasting using charcoal, wood and the like for fuel comprising a vertical frame having an upper surface, a tray for holding the charcoal slidably mounted at the top of the frame, a hood slidably engageable with the upper surface of the frame and having an access door hingedly secured thereto and a cooking grate connected to the top edge of the tray for suspending the food to be cooked over the charcoal. A portion of the upper surface of the frame can be used as a cooking surface, with the hood placed over that portion in order to cook the food without having the food directly exposed to the charcoal.

2 Claims, 4 Drawing Figures

BARBEQUE GRILL

BACKGROUND OF THE INVENTION

The present invention relates to cooking apparatus and more particularly to a barbecue grill having a slidably mounted hood and slideable fuel tray to regulate the amount of heat contained within the cooking area when cooking various foods, the unit providing versatility in the types of cooking available.

In the past, there have been various cooking apparatus employed for using charcoal and the like for outdoor cooking. By way of example is U.S. Pat. No. 4,034,662 in which a cooking apparatus is described. The cooking apparatus has a container-like body supported on legs which may be made from sheet metal and includes a special damper arrangement beneath a corrugated foraminous sheet metal meat support. Charcoal or other fuel is supported in a removable pan inside a large container smaller than the inside area defined by the body and mounted above a sheet metal damper in which there are two large damper openings which air flow is adjusted by means of a manually hinged damper plate. A large, hinged hood may be swung and supported out of the way and the hood has a removable shelf. Special pivoted brackets selectively retain the hood in place.

Another example is illustrated in U.S. Pat. No. 4,074,675. This invention illustrates a gas cooking grill comprising a casing which is generally L-shaped side view, the casing enclosing a horizontal cooking grid in the front portion and the rear horizontal cooking grid at a higher elevation than the vertical or rear portion of the L. The gas burner and the bed of brikettes is disposed under the front grid. The front of the casing is formed by an upper door and a lower door each of which is hinged for swinging movement about a horizontal axis.

The present invention improves upon the prior devices by providing a barbecue grill which has a working surface, a slideable fuel tray, and a hood slidably mounted on the working surface to provide a cooking area of the barbecue grill on the working surface to provide a cooking working surface be covered with the hood for regulating the cooking temperature while allowing a portion of the top of the surface to be used as a cooking surface without placing the food directly over the charcoal. The prior devices only enabled the hood to be moved vertically to an open position from a fully closed position, thus giving little regulation over the amount of cooking area which was covered.

SUMMARY OF THE INVENTION

According to the present invention, an improved barbecue grill is provided. The barbecue grill comprises a vertical frame, a tray for holding the charcoal fuel slidably mounted at the top of the frame, a work surface mounted on top of the frame, a hood slidably engageable with the top of the work surface, said hood having an access door hingedly secured thereto and a cooking grate connected to the top of the frame just above the tray for holding the charcoal.

The design of the hood enables the hood to be moved transversely over the cooking area of the grill in order to regulate the amount of draft and cooking temperature of the food placed on the cooking grate. The hood also contains a hingedly connected access door so that when the hood is covering a substantial portion of the cooking area access to the cooking grate can be obtained by opening the access door.

The tray which holds the grate is mounted to the base in a drawer like manner so that it can be slid open or closed for adding or removing fuel.

Therefore, an object of this invention is to provide a barbecue grill having a slidably mounted hood which can be moved transversely over the cooking area of the grate and the cooking surface of the tray in order to regulate the temperature and draft under different cooking conditions.

It is another object of this invention to provide a barbecue grill which has a drawer-like tray for holding the charcoal or other fuel used in the cooking process such that fuel can be added relatively simply.

It is yet another object of this invention to provide a versatile barbecue grill having an upper surface that serves as a working surface or a cooking surface.

In accordance with these and other objects which will be apparent hereinafter, the instant invention will now be described with particular reference to the accompanying drawings.

DESCRIPTION OF THE PREFERRED EMBODIMENT

Figure 1:
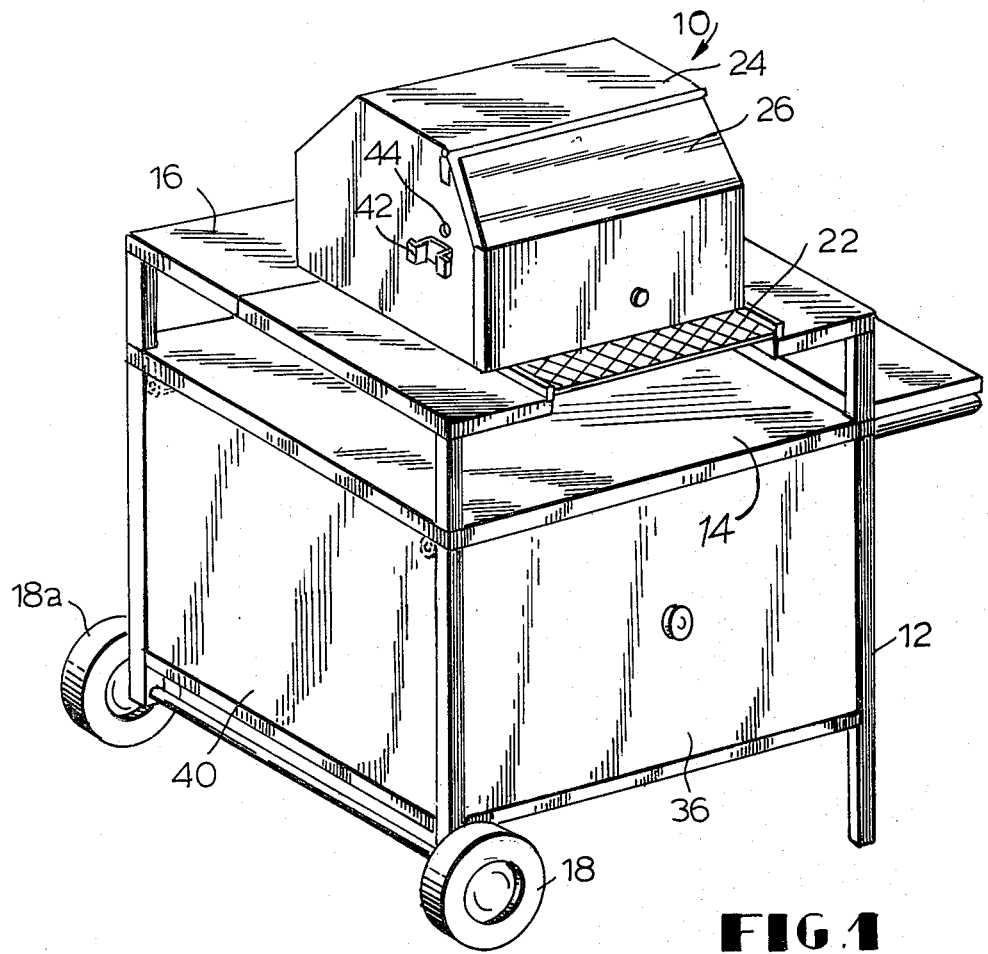
FIG. 1 is a perspective view of the invention.
Figure 2:
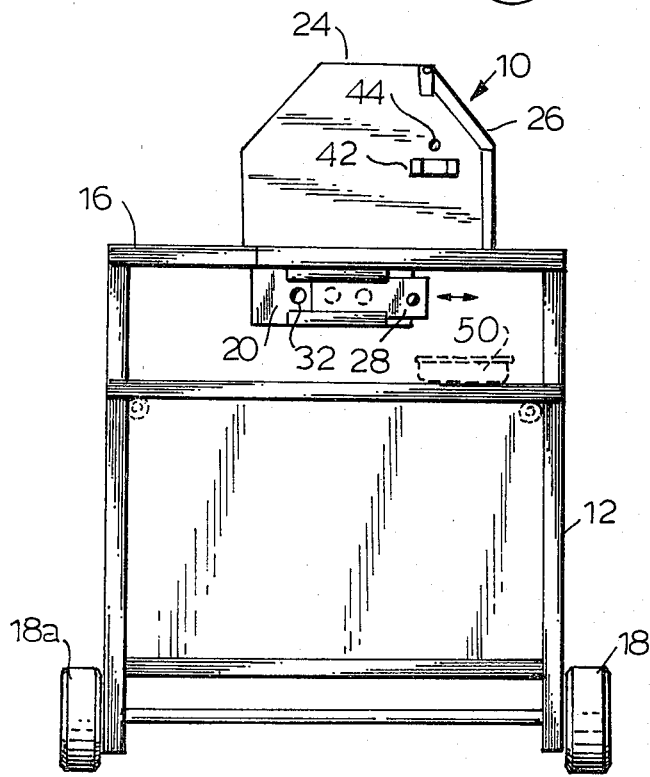
FIG. 2 is a side elevational side view of the invention.
Figure 3:
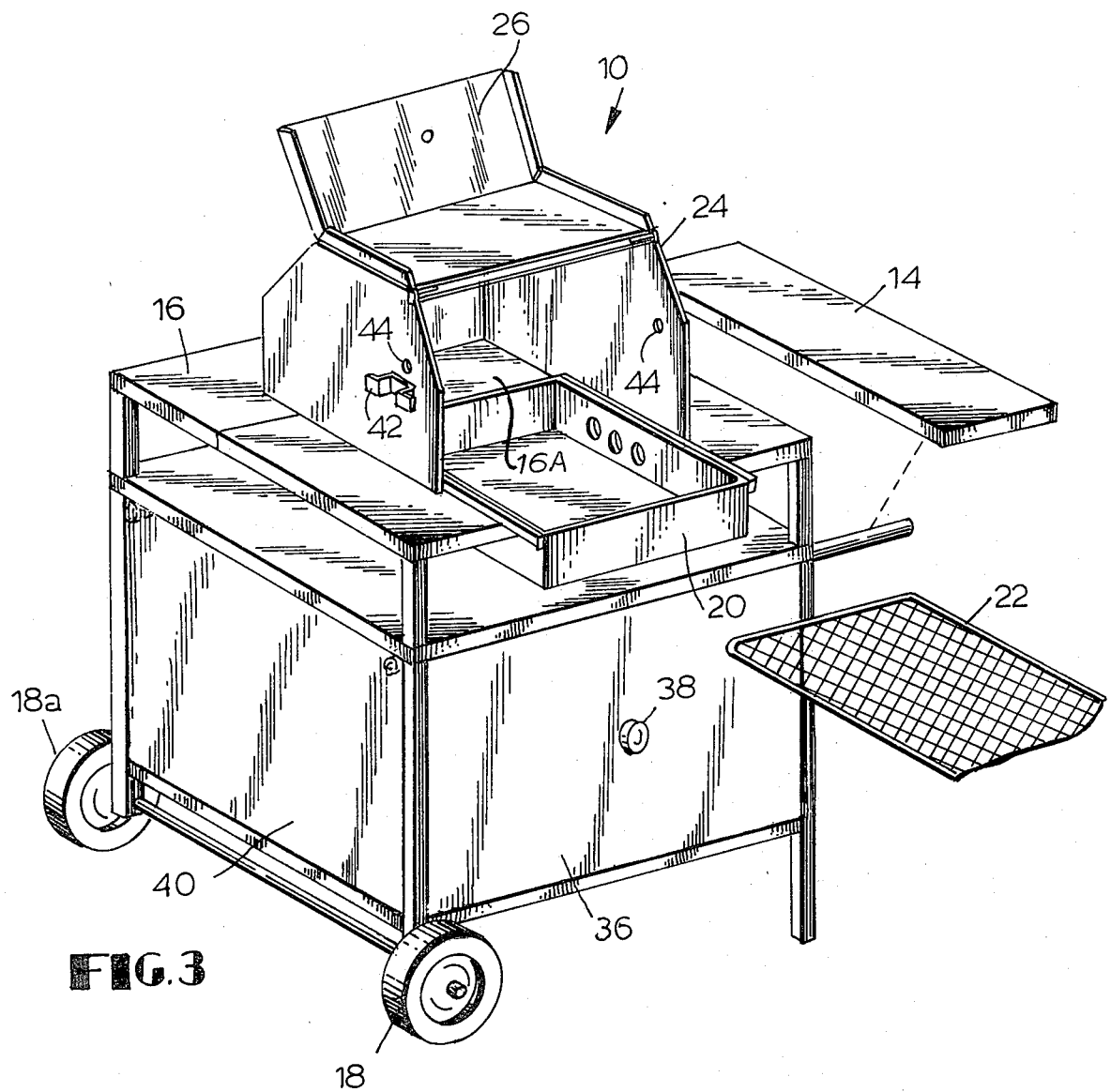
FIG. 3 is a perspective, exploded view of the invention.

Referring to the drawings and particularly FIGS. 1, 2 and 3, the invention is shown generally at 10 comprising vertical frame 12, a tray 20 for holding the charcoal or the like, a cooking grate 22 disposed upon the upper edges of the tray 20, and a hood 24 slidably mounted on the work surface 16, mounted on the top of the frame 12.

A portion of the work surface 16A can be used as a cooking surface when it is desired to keep the food away from direct contact with the charcoal to prevent grease drippings onto the fuel. A pair of wheels 18 and 18a can also be added to the frame 12 to increase the mobility of the invention.

The hood 24 includes a hingedly mounted access door 26 which can be opened into the position shown in FIG. 3. The access door in the open position allows easy access to the cooking area of the barbecue grill 22. The utility shelf 14 can also be added to the frame 12 if desired. This allows the use of a drip pan (dotted in FIG. 2) placed under grate 22 with pan 50 20 placed toward the back of the frame to allow dripping into the pan. The hood 24 is sized to laterally overlap the pan 20 to enclose variably a portion of work surface 16 for warming or cooking foods away from direct exposure from the fuel.

The barbecue may also include walls 40 which enclose the lower part of the frame for storage and a front door access 36 which includes a knob 38 for access into the enclosure area. This would allow someone to keep barbecue utensils, spices and other articles useful in barbecuing in an enclosed storage area.

Figure 4:
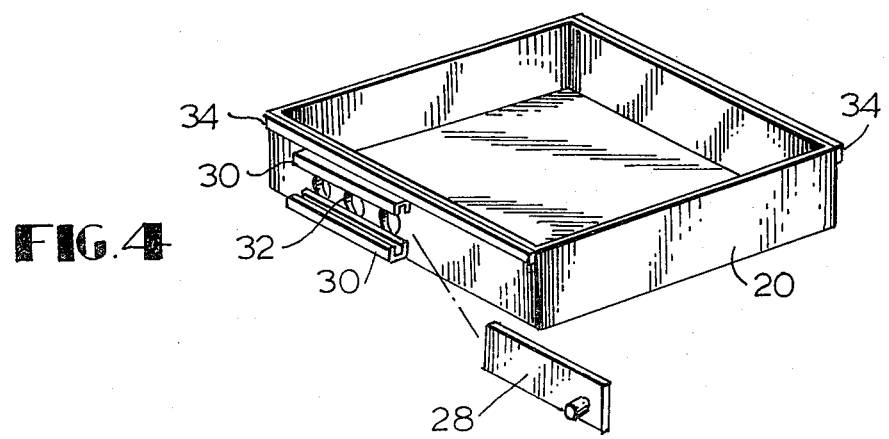
FIG. 4 is a perspective, partially exploded view of the fuel tray used in the present invention.

FIG. 4 shows the fuel pan 20 which includes upper rails 34 which slide along the indentation in the upper work surface 16 to allow the pan 20 to slide in and out for placement of the fuel such as charcoal. The side walls of the pan include apertures 32 which allow for varying the air flow into the pan to control the coal temperatures by moveable plate 28 which slides over apertures 32 along plate guides 30. The apertures may be disposed in one or more sides of the pan and includes cooperating plates 28 for variable adjustment around the pan or on both sides of the pan.

Referring back to FIGS. 1 and 3 the hood may include a pair of apertures 44 to receive a rotisserie and a rotisserie motor mount 42 so that the unit may include a rotisserie that can be power driven in a conventional way.

Referring to the pan in FIG. 4, an additional grate can be placed in the bottom of the pan upon which the charcoal briquettes are mounted for additional drafting.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An improved barbeque grill comprising:
    a first horizontally-supported surface;
    a plurality of rigid vertical support members attached to said first surface;
    a second horizontally-supported surface mounted parallel to and above said first surface and attached to said vertical support members, said second surface having a recessed area along at least one side;
    a firebox mounted to but beneath said second surface, part of said firebox extending below the recessed area of said second surface;
    a grate mounted in said recessed area;
    a removeable enclosure moveably mounted on said second surface, said enclosure sized to encompass a substantial portion of said recessed area and a portion of said second surface simultaneously; and
    a drip pan mounted on said first surface beneath a portion of the grate not covering the firebox,
    whereby the barbeque can be used simultaneously or individually for baking, grilling, roasting and warming dependent upon the placement of the foodstuff on the grate or the second surface and the location of the enclosure.

2. An improved barbeque grill as in claim 1, including:
    a hinged access door mounted on said enclosure allowing access to the inside of said enclosure.

* * * * *